United States Patent [19]

Durig

[11] 4,231,533

[45] Nov. 4, 1980

[54] STATIC SELF-CONTAINED LASER SEEKER SYSTEM FOR ACTIVE MISSILE GUIDANCE

[75] Inventor: Richard F. Durig, Xenia, Ohio

[73] Assignee: The United States of America as represented by the Secretary of the Air Force, Washington, D.C.

[21] Appl. No.: 593,597

[22] Filed: Jul. 9, 1975

[51] Int. Cl.³ ................. F42B 15/02; F41G 7/24; F41G 7/26

[52] U.S. Cl. .............................. 244/3.16; 356/5

[58] Field of Search ............ 244/3.13, 3.15, 3.16; 340/5 H

[56] References Cited

U.S. PATENT DOCUMENTS

| 3,398,918 | 8/1968 | Girault | 244/3.13 |
| 3,680,041 | 7/1972 | Smith, Jr. | 340/5 H |
| 3,691,517 | 9/1972 | Riggs | 340/5 H |
| 3,841,585 | 10/1974 | Evers-Euterneck | 244/3.15 |
| 3,860,199 | 1/1975 | Dunne | 244/3.13 |

Primary Examiner—Charles T. Jordan
Attorney, Agent, or Firm—Joseph E. Rusz; Robert Kern Duncan

[57] ABSTRACT

Four pulse-repetition-frequency coded laser diode arrays emit four beams in quadrature relationship having a central optical axis coinciding with the missile axis. The returned reflected energy from a target impinges upon an optically centered holographic quadrant selector detection system which provides quadrature output signals. These quadrature output signals are passed through respective pulse-repetition-frequency discriminators corresponding to the quadrature prf coded transmitted beams. The outputs from the discriminators are processed through a null comparison circuit to provide output signals for actuating the servo guidance system of the missile to center the optical axis, which is also the missile axis, on the target so that the missile continuously seeks and eventually flies into the target.

1 Claim, 4 Drawing Figures

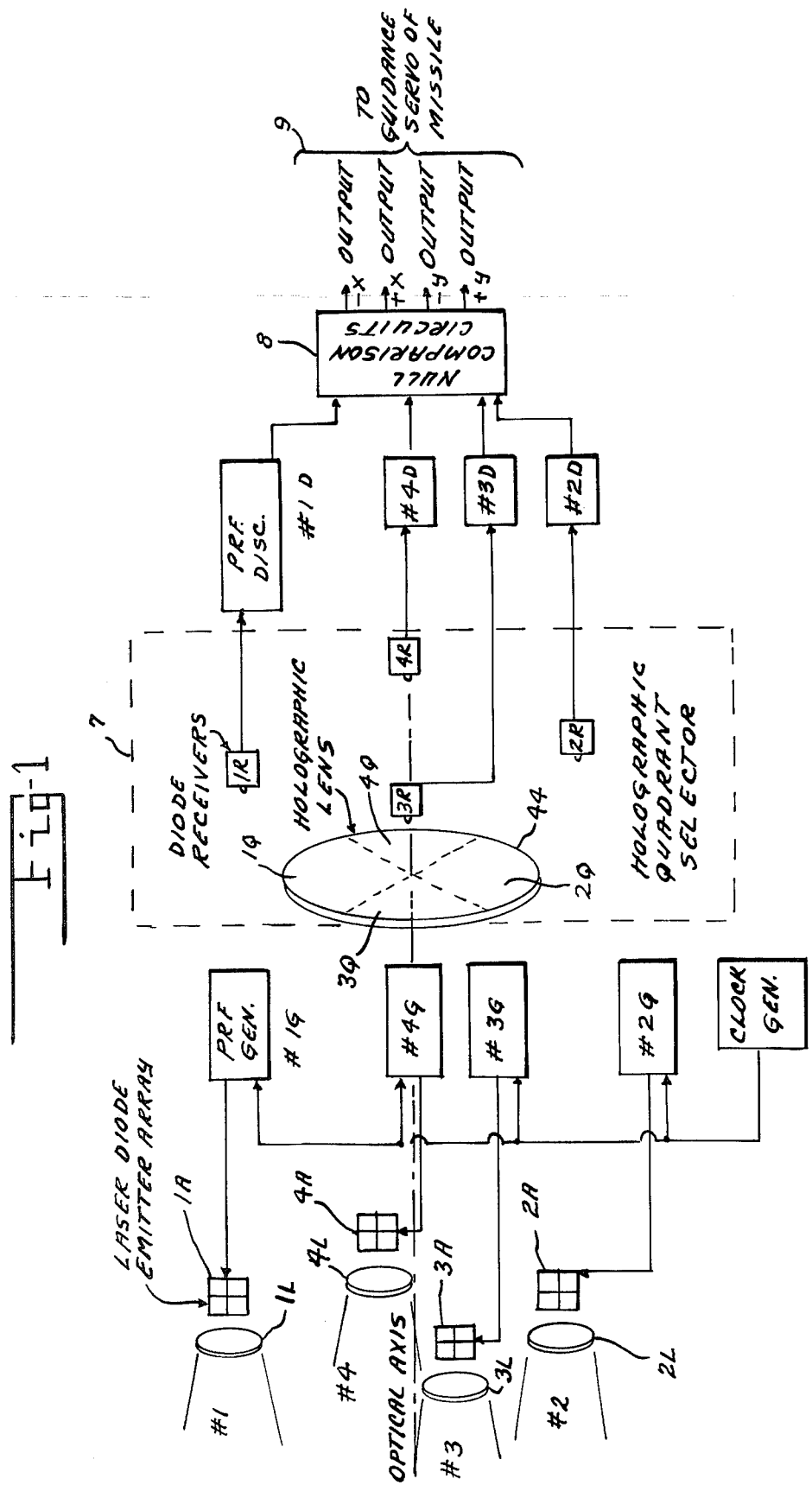

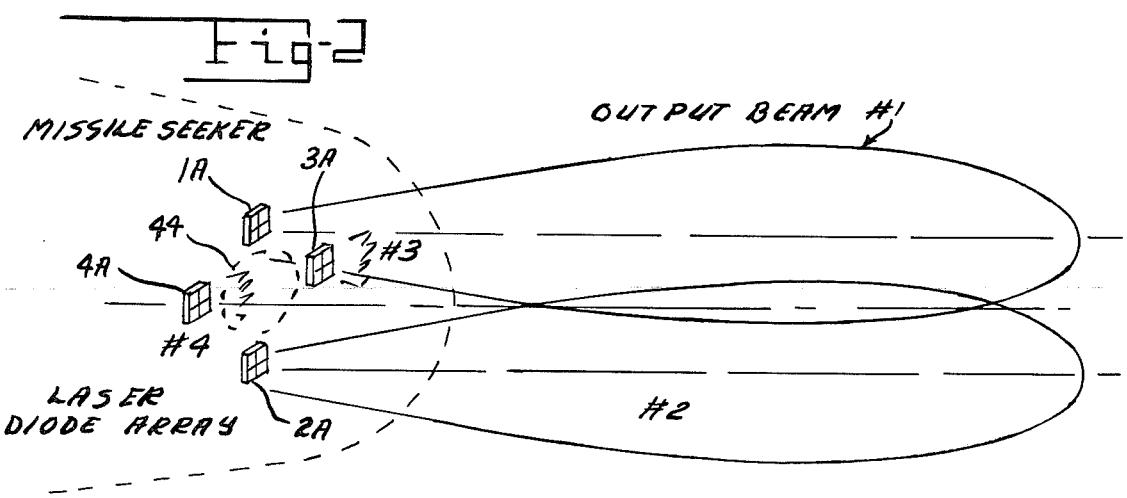
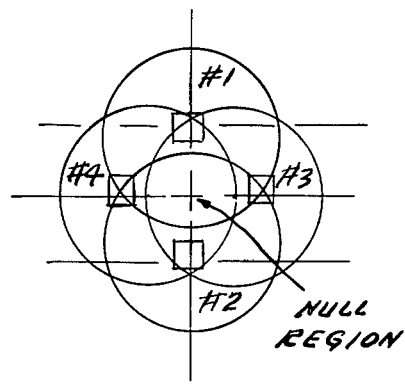
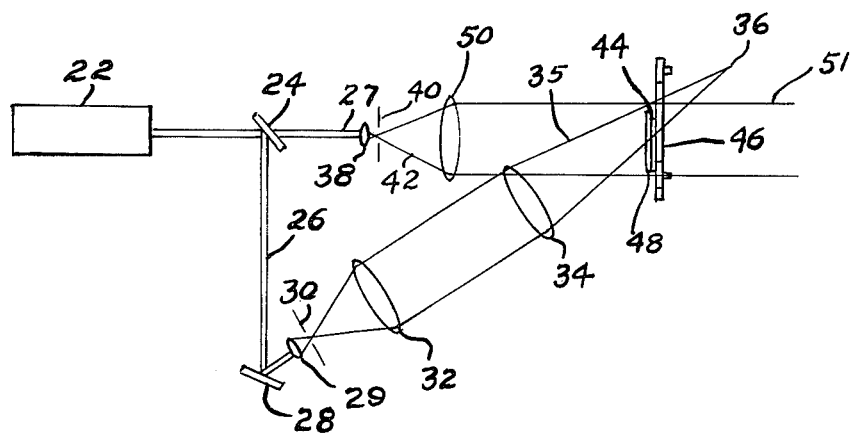

STATIC SELF-CONTAINED LASER SEEKER SYSTEM FOR ACTIVE MISSILE GUIDANCE

RIGHTS OF THE GOVERNMENT

The invention described herein may be manufactured and used by or for the Government of the United States for all governmental purposes without the payment of any royalty.

BACKGROUND OF THE INVENTION

The field of the invention is in laser target tracking systems.

Typical examples of similar prior art devices are exemplified by patents U.S. Pat. No. 3,603,686 to patentees T. O. Paine et al; U.S. Pat. No. 3,751,166 to patentees G. W. Starkey et al; and U.S. Pat. No. 3,781,111 to patentees J. C. Fletcher et al. Automatic tracking and guidance systems are well known. Generally the prior art devices employ mechanical moving parts. In some highly sophisticated prior art devices beam movement is accomplished by electronic scanning. In general, the prior art devices have been larger and more complex than desirable for containment in the nose of an air-to-air missile.

SUMMARY OF THE INVENTION

The missile guidance system herein disclosed provides a self-contained system, without any moving parts, that is relatively simple and low in cost.

BRIEF DESCRIPTION OF THE DRAWING

FIG. 1 is a schematic diagram representation of an embodiment of the invention;

FIG. 2 is a pictorial schematic diagram of a nose of a missile containing an embodiment of the invention and an illustrative transmitting beam diagram.

FIG. 3 is an illustrative schematic diagram from afar looking down the optical axis toward the missile seeker illustrating the null region about the optical axis; and FIG. 4 is a schematic diagram illustrative of the fabrication of a holographic quadrant selector lens.

DESCRIPTION OF THE PREFERRED EMBODIMENT

Referring to FIGS. 1, 2 and 3, the transmitter portion of the seeker system consists of conventional arrays of laser diodes 1A, 2A, 3A, and 4A, arranged in quadrature spatially so that the beams emitted from the arrays form intersecting conical beam patterns numbers 1 through 4 as further illustrated in FIGS. 2 and 3. For clarity, the conventional optical lenses 1L, 2L, 3L, and 4L shown in FIG. 1 are not illustrated in FIGS. 2 and 3. Such laser diode arrays and optical lens systems are conventional well known devices. The arrays are arranged in an optical quadrature configuration inside the seeker head of a missile, as illustrated in FIG. 2, so that the intersecting output beam pattern is optically centered with the missile axis. Any object in the beam pattern will reflect laser energy back toward the missile seeker. If the object is not on the optical axis about which the four beams are centered then a proportionately larger amount of energy from that beam (or beams) most directly impinging on the object is returned.

The energy reflected back to the missile seeker falls on (or, is received by) the holographic quadrant selection lens plate 44. The action of the holographic quadrant lens plate 44 is to divide the energy falling on the lens aperture into quadrants and focus the energy from each respective quadrant on a respective diode receiver (photodetector). Thus, the returned (scattered) energy from an object in the beam pattern that falls in the quadrant 1Q of the aperture of the holographic quadrature lens 44 is brought to focus on diode receiver 1R. Likewise, the energy present in each quadrant of the aperture is focused on its respective diode detector by the action of the holographic quadrant selector lens plate 44.

A suitable holographic quadrant detection system 7 is disclosed in patent application Ser. No. 369,030 filed June 8, 1973, by Tommy L. Williamson, et al, now U.S. Pat. No. 4,185,919.

The system therein disclosed for producing the holographic lens is also similar to that described in U.S. Pat. No. 3,586,412 to patentee Leith. Referring to FIG. 4, light from a coherent source 22, such as a laser, is split by beam splitter 24 which divides the light between beams 26 and 27. The light beam 26 is reflected by mirror 28 through lens 29. A pin hole filter 30 is placed at the focal point of lens 29 to provide a diverging beam for collimating lens 32. The light from collimating lens 32 is directed to a converging lens 34 which provides a beam 35 which converges to point 36. The beam 27 is directed to a lens 38. The light from lens 38 is directed through a pin hole filter 40 placed at the focal point of lens 38. This provides a diverging beam 42 which is collimated by lens 50 into a collimated beam 51. A holographic plate 44 is mounted on a rotatable support 46 and is positioned in the beams 35 and 51. A mask 48 which permits only one quadrant of the holographic plate to be illuminated at a time is positioned in front of plate 44, as shown in FIG. 4. As each quadrant is exposed, the support 46 is rotated 90 degrees and another quadrant of the holographic plate exposed. When all four quadrants have been exposed the holographic plate 44 is removed from the support and developed in a conventional manner. The finished holographic quadrant selector lens 44 will focus to four separate points, one for each quadrant of its aperture, the light that falls upon it.

In the embodiment of the invention illustrated by FIG. 1 the beam null seeking mechanism utilizes pulse rate discrimination logic. The laser diode arrays 1A, 2A, 3A, and 4A are electrically pulsed at different rates. The logic circuitry of each pulsed laser diode/detector combination discriminates against the pulse rate of every other diode/detector configuration. For instance, laser diode array 1A is pulsed by the pulse repetition frequency (prf) generator 1G at a particular pulse repetition frequency, different from the prf frequencies of the other three prf generators. Discriminator 1D provides an output signal proportional to the amplitude of signals having only the particular prf of prf generator 1G. Likewise, only signals having the prf of prf generator 2G will be passed by discriminator 2D, and similarly for the other two channels. It is to be noted that the holographic lens 44 has a relatively large aperture or capture area, thus the signal capture area of lens quadrant 1Q is many, many times that of the substantially point detection area of the detector of diode receiver 1D. It can now be seen that the holographic lens 44 cooperating with the other components of the system provides a compact, optically aligned system having greatly improved sensitivity.

The conventional null comparison circuits 8 compares the outputs from the four discriminator circuits and provides a right-left or up-down signal to the missile direction servo system to actuate the missile directional control system until the missile is aimed directly toward the target, i.e., the target is centered on the optical axis of the seeker and the return signals from each array are all equal, and a null or no correction signal is sent to the servo control system. The null signal (or departure therefrom) is thus conventionally used to drive the missile such as to center the optical axis on the target and maintain it in that alignment. The only necessary requirement is to initially position the seeker such that the target will be within the beam pattern capture area so that lock-on with the target will be achieved when the guidance system is activated.

Another embodiment of the invention in which the discrimination is based on wavelength rather than pulse rate, may be constructed by using laser diodes which each have a different spectral characteristic and a corresponding matching spectral filter is placed over each corresponding diode receiver in the holographic quadrant selector system. The prf generator 1G through 4G and prf discriminators 1D through 4D are not needed. The outputs of the diode receivers then actuate the null comparison circuits in the conventional manner.

A specific embodiment of the invention suitable for ranges up to approximately 1 km may be constructed using laser transmitter diode arrays operating at approximately 0.8 $\mu$m with peak powers of approximately 65 watts. The arrays are chopped (modulated) at prf frequencies of 800, 900, 1000, and 1100 Hz and having a 50% duty cycle. A typical suitable array is RCA type C30015. The holographic quadrant selector lens plate has an effective aperture per quadrant of approximately 100 sq. cm. The spectral response of the diode detectors must encompass the transmitted frequency. A suitable PIN diode for this embodiment is the type PIN-020A manufactured by United Detector Technology Corporation. A suitable comparator having four independent inputs and providing output signals proportional to the differences in amplitudes of the input signals is a type LM 139 Quad Comparator integrated circuit manufactured by National Semiconductor Corp. The target is assumed to be approximately 1 meter square with a reflectivity of approximately 0.8 and the typical atmospheric transmission factor is also 0.8. Typical beam divergence angle for each array is approximately 0.1 radian. The foregoing values are set forth as an illustrative example, and are not critical.

I claim:

1. A static target seeker system for providing active missile guidance signals comprising:
   a. a first laser diode array emitting an optical beam modulated by a first pulse repetition frequency;
   b. a second laser diode array emitting an optical beam modulated by a second pulse repetition frequency;
   c. a third laser diode array emitting an optical beam modulated by a third pulse repetition frequency;
   d. a fourth laser diode array emitting an optical beam modulated by a fourth pulse repetition frequency;
   e. means for placing the said four optical beams in respective quadrature relationship about an optical axis;
   f. a holographic quadrant selector lens plate positioned on the said optical axis, the said lens having a quadrature focal point for each quadrant;
   g. a diode detector positioned at each said focal point;
   h. a discriminator associated with each diode, each discriminator providing an output substantially responsive only to signals from the respective corresponding emitting array; and
   i. a null comparison circuit receiving the outputs from the said discriminators and providing target guidance signals to the said missile.

* * * * *